(12) United States Patent
Dutro et al.

(10) Patent No.: US 12,152,833 B2
(45) Date of Patent: Nov. 26, 2024

(54) TEMPERATURE MONITORING DEVICE

(71) Applicant: Gary L. Sharpe, Naples, FL (US)

(72) Inventors: Brian Dutro, Dublin, OH (US); Hope Haske, Columbus, OH (US); Stephen Stock, Hilliard, OH (US); Kurt Wolf, Dublin, OH (US)

(73) Assignee: Gary L. Sharpe, Naples, FL (US)

( * ) Notice: Subject to any disclaimer, the term of this patent is extended or adjusted under 35 U.S.C. 154(b) by 145 days.

(21) Appl. No.: 17/827,066

(22) Filed: May 27, 2022

(65) Prior Publication Data

US 2023/0384025 A1   Nov. 30, 2023

(51) Int. Cl.
F25D 29/00     (2006.01)

(52) U.S. Cl.
CPC ......... *F25D 29/008* (2013.01); *F25D 29/005* (2013.01); *F25D 2700/121* (2013.01); *F25D 2700/122* (2013.01)

(58) Field of Classification Search
CPC . A61B 5/01; A61B 5/076; A61B 5/681; A61J 1/18; F25D 29/005; F25D 29/008; F25D 11/006; F25D 21/02; F25D 29/00; F25D 2700/121; G01D 11/245; G01K 1/024; G01K 1/08; G01K 1/14; G04G 17/02
USPC ....................................................... 340/585
See application file for complete search history.

(56) References Cited

U.S. PATENT DOCUMENTS

| | | | | |
|---|---|---|---|---|
| 2,012,741 | A * | 8/1935 | Brainard ................. | G01K 1/14 248/214 |
| 4,848,927 | A * | 7/1989 | Daily ...................... | G01K 1/14 374/208 |
| 6,193,201 | B1 * | 2/2001 | Babcock ................. | B65D 5/44 248/205.3 |
| 7,883,463 | B2 * | 2/2011 | Sattler .................... | A61B 5/6838 600/300 |
| 11,311,130 | B1 * | 4/2022 | Ebersole ................ | A47B 61/003 |
| 2002/0005120 | A1 * | 1/2002 | Kurmlavage .......... | A47J 37/048 99/441 |
| 2010/0224752 | A1 * | 9/2010 | Best ....................... | F24C 15/16 248/163.1 |
| 2016/0199576 | A1 * | 7/2016 | Savage .................. | A61B 5/6805 604/66 |
| 2020/0217693 | A1 * | 7/2020 | Kundman ............. | G01R 31/343 |
| 2021/0016095 | A1 * | 1/2021 | Chen ..................... | A61N 1/3655 |
| 2021/0207982 | A1 * | 7/2021 | Hartmann ............. | G01D 3/022 |
| 2023/0111797 | A1 * | 4/2023 | Casucci ................. | F24C 7/085 126/273 R |

FOREIGN PATENT DOCUMENTS

GB           2523576 A  *  9/2015  ............ G01K 11/12

* cited by examiner

*Primary Examiner* — Stephen R Burgdorf
(74) *Attorney, Agent, or Firm* — Standley Law Group LLP; Jeffrey S. Standley; Beverly A. Marsh

(57) ABSTRACT

Temperature monitoring device for detecting actual temperatures of contents within a refrigerator or freezer. The temperature monitoring device has a silicone body containing a circuit assembly with a temperature sensor positioned near a thermal break. A bidirectional flange located on top of the device allows it to be suspended from a wire rack. A port located on the body permits the temperature monitoring device to be plugged into a power source and transmit temperature data.

12 Claims, 15 Drawing Sheets

TEMPERATURE MONITORING DEVICE

CROSS-REFERENCE TO RELATED APPLICATIONS

This application makes no claim of priority.

TECHNICAL FIELD

Exemplary embodiments relate generally to temperature monitoring devices. More particularly, exemplary embodiments relate to temperature monitoring devices with thermal buffers for use in refrigerators and freezers.

BACKGROUND OF THE INVENTION

In hospital and clinical settings, a significant number of pharmaceuticals and related items must be stored in refrigerators or freezers prior to use in order to preserve their efficacy and/or safety. Such items must be closely monitored to ensure proper temperature control. If the temperature of pharmaceutical items is too high or too low, the items may suffer undesirable effects to their efficacy and/or safety, and be rendered unusable. Federal regulations require that certain pharmaceuticals be stored at appropriate temperatures. For example, according to the Centers for Disease Control and Prevention, vaccinations licensed for refrigerator storage should be stored at a temperature between 2° C. and 8° C. (36° F. and 46° F.), and vaccines stored in a freezer should maintain a temperature of between −50° C. and 15° C. (−58° F. and 5° F.). Proper temperature monitoring is therefore highly important. However, it can be difficult to monitor the temperature of items within a refrigerator, particularly because it is often desirable to monitor the internal temperature of items within a refrigerator, not the ambient air temperature which can be subject to quick fluctuations.

Physically locating a temperature monitoring device within a refrigerator or freezer often presents a variety of challenges. Many times, a refrigerator or freezer is full of items which may be deposited or removed quickly. A temperature monitoring device that sits on a refrigerator shelf may take up valuable shelf space that could be used instead for storing pharmaceuticals or other items. Also, a device that sits on a refrigerator shelf is likely to be jostled, hit, or knocked over by surrounding pharmaceuticals, other items, or a person who is in a rush. Conventional temperature monitoring devices risk being damaged and rendered inoperable when they are in such an environment. Complicating matters further, applicable government regulations may require that a temperature monitoring device be located in a central part of the refrigerator in order to ensure that the device is providing an accurate reading.

Temperature monitoring devices intended to mimic the thermal curve of liquids, such as liquid vaccines contained in glass vials, face further challenges to the extent that they are conventionally comprised of liquids (such as glycol) sealed in glass vials or other containers. Glass vials are susceptible to breakage and the potential for injury to a user. Glass vials containing glycol or other liquid substances are also difficult to manufacture because a sensor must be located within the liquid substance, but the glass vial must ultimately be sealed to properly prevent the liquid substance from escaping. Furthermore, the use of glass vials and/or liquids can cause issues during transport, particularly if such devices are transported by air. Pressure changes in the surrounding environment during flight may damage the temperature monitoring devices (breaking seals or causing the vials to crack or shatter) and render them inoperable.

SUMMARY OF THE INVENTION

In an exemplary embodiment, a temperature monitoring device is comprised of a body and a bidirectional flange that is integrally connected to the body. The body is comprised of solid silicone, and a temperature sensor is located within the body. The temperature sensor is in direct contact with the solid silicone and configured to collect temperature data associated with the solid silicone. The temperature data may correspond to internal temperatures experienced by items stored in a refrigerator or freezer. The bidirectional flange is flexible such that it can be manipulated as needed to insert the flange between two wires on a wire shelf or insert the flange between two other types of surfaces or projections. The bidirectional flange allows the temperature monitoring device to be removably inserted into and suspended from a wire shelf in a refrigerator or freezer. The bidirectional flange may be silicone or another material. The temperature sensor may be provided as part of a larger circuit assembly contained within the body. The circuit assembly may include memory storage for storing calibration information unique to the temperature sensor. The circuit assembly may also contain a light to indicate whether the circuit assembly is receiving power, or communicate other information to a user.

In another exemplary embodiment, a temperature monitoring device comprises a body having a top end defined by a first width, and a bidirectional flange connected to the top end of the body that is defined by a second width. The first width is narrower than the second width. A circuit assembly located within the body comprises a temperature sensor configured to provide temperature data. The body and bidirectional flange may be comprised of silicone. The bidirectional flange may be flexible. The body and bidirectional flange may be formed from one continuous volume of solid silicone, with the circuit assembly largely embedded or encased therein. The only access to the circuit assembly may be through a port hole located in the body. The circuit assembly may comprise a first end and a second end, with the temperature sensor located on the second end and a thermal break located between the first end and the temperature sensor. The thermal break may be a circular void or hole in the circuit assembly that aids to prevent the heat generated by the circuit assembly from impacting the readings of the temperature sensor. The circuit assembly may include memory storage for storing calibration information unique to the temperature sensor. Calibration information may be a calibration factor that can be applied by a remote processor to temperature data obtained by the temperature sensor. The circuit assembly may also contain a light to indicate whether the circuit assembly is receiving power, or communicate other information to a user. The body may be generally shaped as a triangular prism with a front face, a rear face, and three sides. The bidirectional flange may extend from the front face to the rear face, or may extend along any portion therebetween.

In another exemplary embodiment, a temperature monitoring device is comprised of a solid silicone volume that in turn is comprised of a body and a bidirectional flange. The body may have a generally triangular prism shape, with a front face, a rear face, a bottom side, a right side, and a left side. The body may have a first vertex between the bottom side and right side, a second vertex between the bottom side and left side, and a transected or flattened vertex between the right side and left side. The bidirectional flange may extend from said front face to said rear face along the transected vertex. The bidirectional flange may comprise two underhangs, and the bidirectional flange may have a width greater than the width of the transected vertex. The bidirectional flange may be flexible. A circuit assembly located within the body may comprise a temperature sensor in direct contact with the solid silicone volume, and be configured to provide data related to the temperature of the solid silicone volume. The circuit assembly may also comprise memory storage configured to store calibration information unique to the temperature sensor.

BRIEF DESCRIPTION OF THE DRAWINGS

The advantages and other characteristics of the disclosed embodiments will be better understood when attention is directed to the accompanying drawings, wherein identical elements are identified with identical reference numerals and wherein.

DETAILED DESCRIPTION

Figure 1:
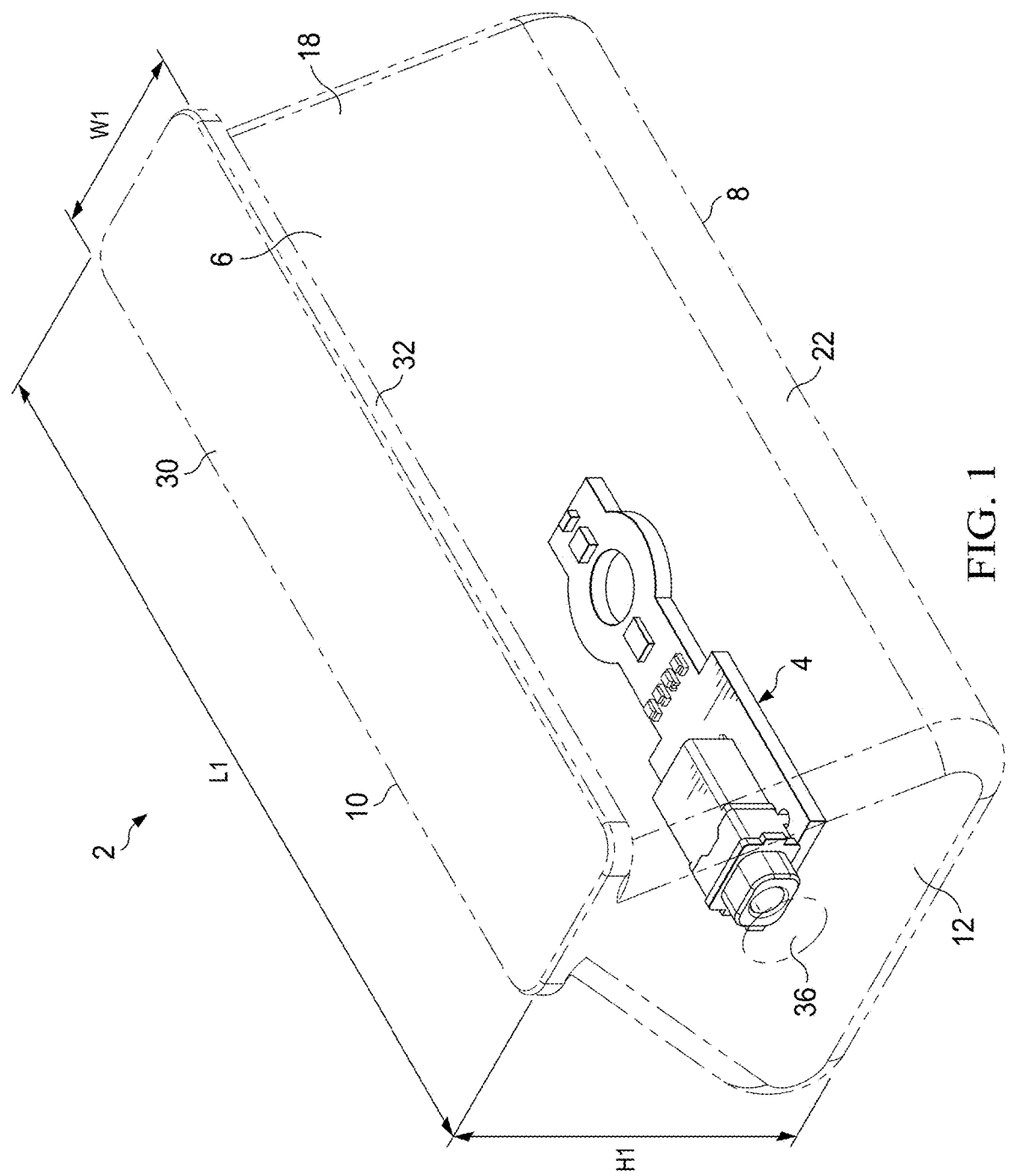
FIG. 1 is a perspective view of an exemplary embodiment of a temperature monitoring device is shown, with internal circuit assembly visible.
Figure 2:
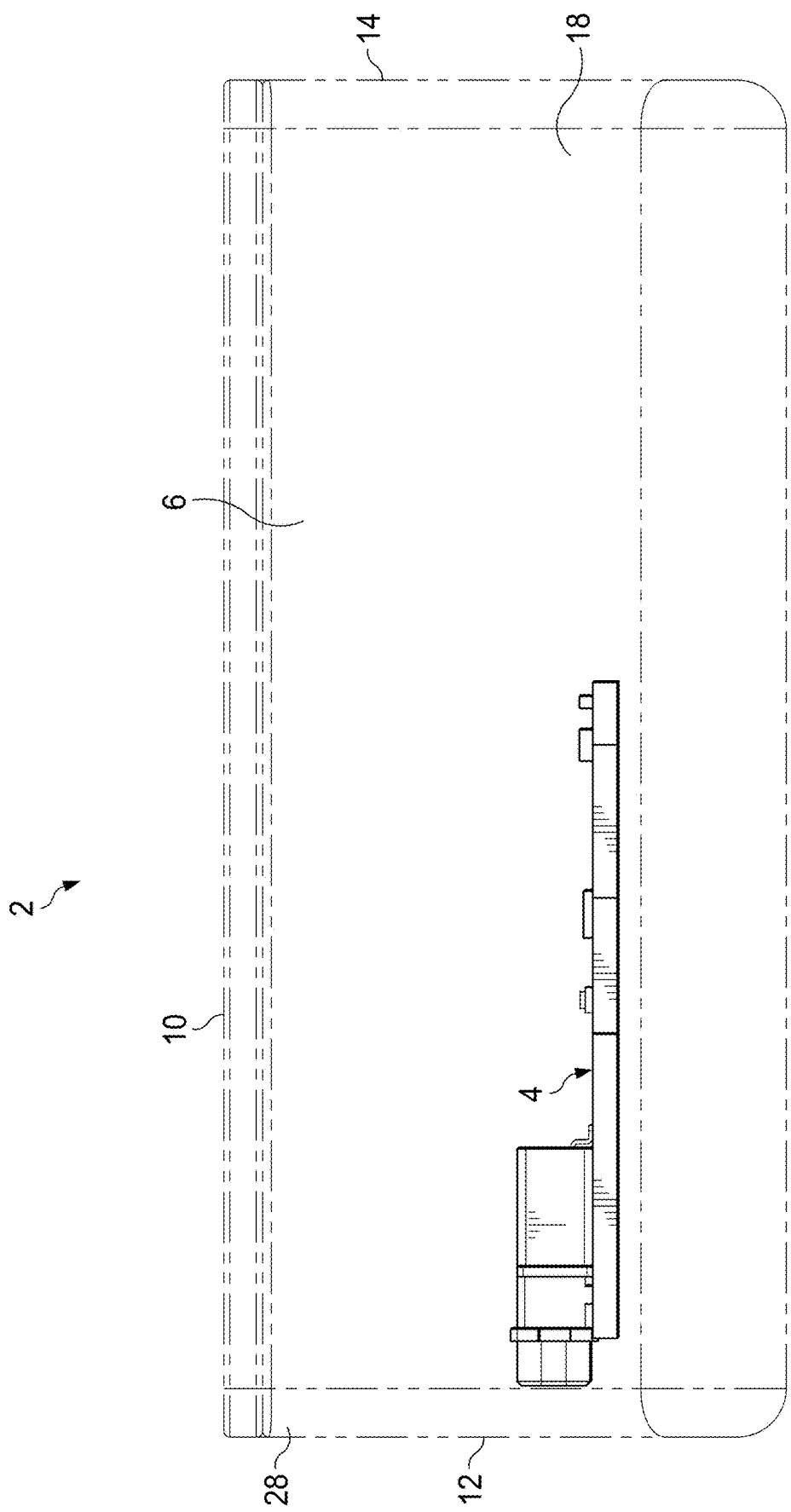
FIG. 2 is a right side elevational view of the temperature monitoring device of FIG. 1 with internal circuit assembly visible.
Figure 3:
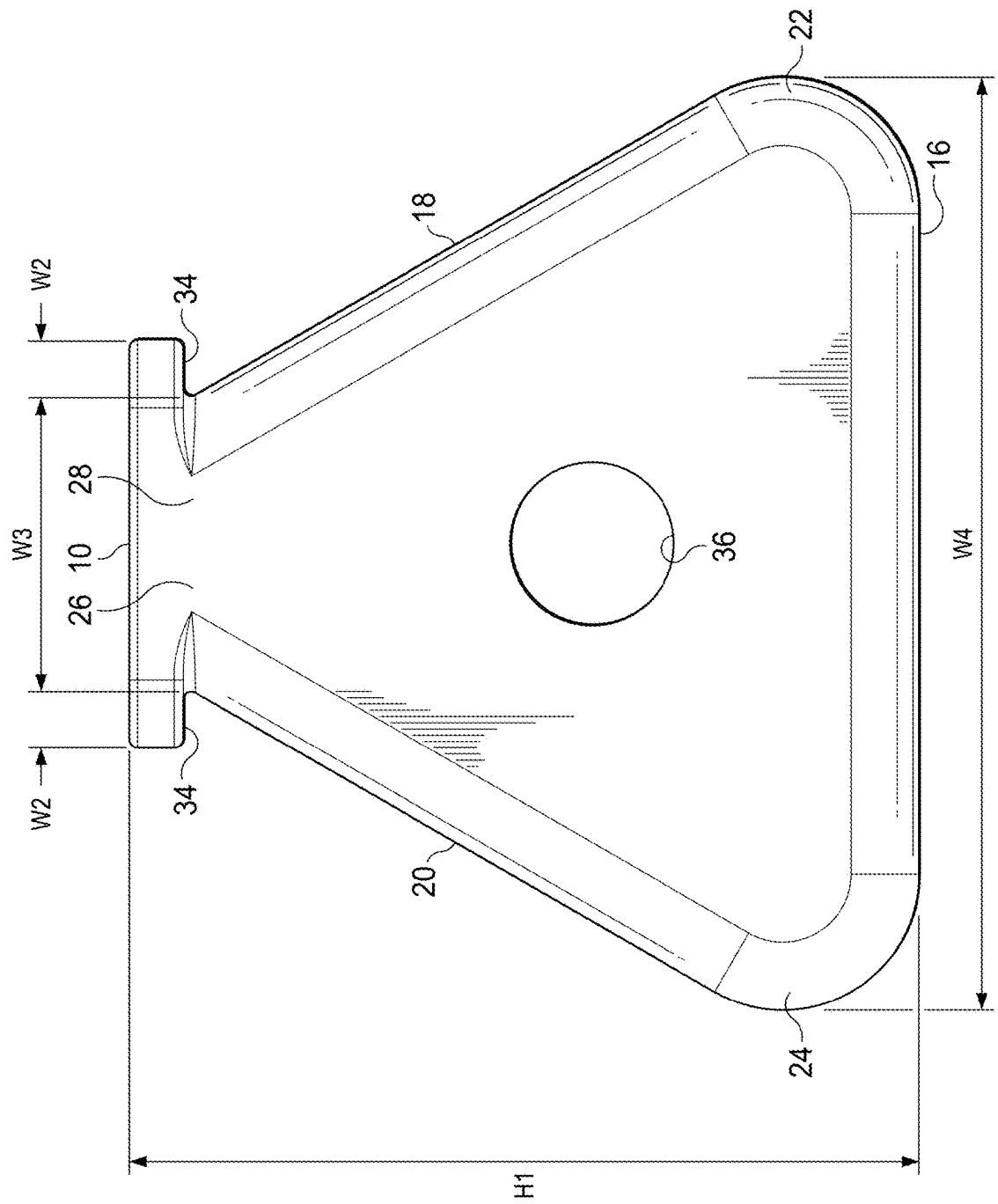
FIG. 3 is a front elevational view of the temperature monitoring device of FIG. 1 is shown.

Directing attention to FIGS. 1-3, an exemplary embodiment of a temperature monitoring device 2 is shown. The temperature monitoring device 2 is comprised of a circuit assembly 4 encased in a silicone volume 6. In the exemplary embodiment, the silicone volume 6 is comprised of a body 8 and a bidirectional flange 10. The body 8 may have the general shape of a triangular prism with a front face 12, a rear face 14, a bottom side 16, a right side 18, and a left side 20. The vertices 22, 24 between the bottom side 16 and right and left sides 18, 20 may be rounded and the vertex 26 between the right side 18 and left side 20 may be transected or flattened.

The bidirectional flange 10 may be located along the top end 28 of the body 8, and have a top surface 30 with a generally rectangular outer perimeter 32. The top surface 20 may be flat. The bidirectional flange 10 may extend from the front face 12 to the rear face 14, and have a length equal to that of the prism (L1) and a width W1 that extends bilaterally over the top of the body 8. Underhangs 34 having a width of W2 are located on either side of the bidirectional flange 10 and extend along the length of the body 8. The top end 28 of the body 16 may have a minimum width W3 that is narrower than the width W1 of the bidirectional flange 10.

In an exemplary embodiment, the volume 6 may have a height H1 of 1.45 inches, a length L1 of 3.5 inches. The body may have a minimum width W3 of 0.5 inches and a maximum width W4 of 1.68 inches. The bidirectional flange 10 may have a width W1 of 0.75 inches, and the underhangs 34 may have a width W2 of 0.125 inches each. In this exemplary embodiment the temperature monitoring device may have a thermal curve that mimics that of a liquid contained within a glass vial, such as a vaccine or other liquid drug.

In other exemplary embodiments the volume may have a variety of different dimensions. For example, the flange may be much wider, or the underhangs may have widths that differ from one another. In some exemplary embodiments the flange may extend beyond the ends or sides of the body, or, the flange may extend only across a portion of the body. Furthermore, in other exemplary embodiments the body may not have the general shape of a triangular prism, but may instead have the general shape of a square prism, rectangular prism, pentagonal prism, hexagonal prism, sphere, or cube. The body may have any other type of shape. The flange may extend from any edge or surface, or, in some exemplary embodiments, there may be multiple flanges located along multiple edges or surfaces. One of ordinary skill in the art will recognize that a variety of different sizes, dimensions, shapes, and configurations may be utilized without departing from the inventive concept. One of ordinary skill in the art will also recognize that by changing the dimensions and size of the volume, the thermal curve of the temperature monitoring device may be changed as desired as the amount of thermal buffer (silicone or another material) surrounding the circuit assembly, and in particular any temperature sensor located on the circuit assembly, is increased or decreased. For example, increasing the size of the volume may alter the thermal curve such that the device is comparatively slower to respond to cooling and heating than a glass vial of liquid. Conversely, decreasing the size of the volume may alter the curve so that the device is comparatively quicker to respond to cooling and heating.

On the front face 12 of the body may be a port 36. The port 36 may permit access to the circuit assembly 4 and may be sized to accommodate the plug of a power cord or other connection to a power source. The port 36 may provide access to the only portion of the circuit assembly 4 that is not embedded, overmolded, or otherwise enclosed in silicone. The port 36 of the exemplary embodiment of FIGS. 1-3 is circular and sized to accommodate a standard ⅛" plug for a 3.3 v power supply. However, in other embodiments the port may accommodate different plug sizes, and different voltages. The port may be sized such that when a plug is inserted, a suction seal is created between the body 8 and the plug.

The silicone volume 6 may be comprised of solid silicone that is semitransparent or transparent. In some embodiments the silicone may be opaque. In other embodiments the silicone may be tinted with one or more colors. In an exemplary embodiment the silicone may be of a sufficient elasticity (durometer) to deform for the purpose of installing and removing the sensor from a refrigerator or freezer rack.

In an exemplary embodiment, only the body 8 may be comprised of silicone, while the bidirectional flange 10 may be comprised of one or more different materials.

The circuit assembly 4 may be located proximate to the port 36 and extend through a central portion of the body 8, such that the circuit assembly does not connect with any of the outer surfaces of the body 8 and silicone generally surrounds the circuit 4 assembly on all sides, save for the port 36. The location of the circuit assembly 4 within a central portion of the body 8 may allow the surrounding silicone of the body 8 to provide a cushion for the circuit assembly 4 on all sides and protect the circuit assembly 4 from strong forces if the device 2 is dropped, falls, or is hit by another object. In different exemplary embodiments the circuit assembly 4 may be positioned in different orientations and locations within the body.

Figure 4:
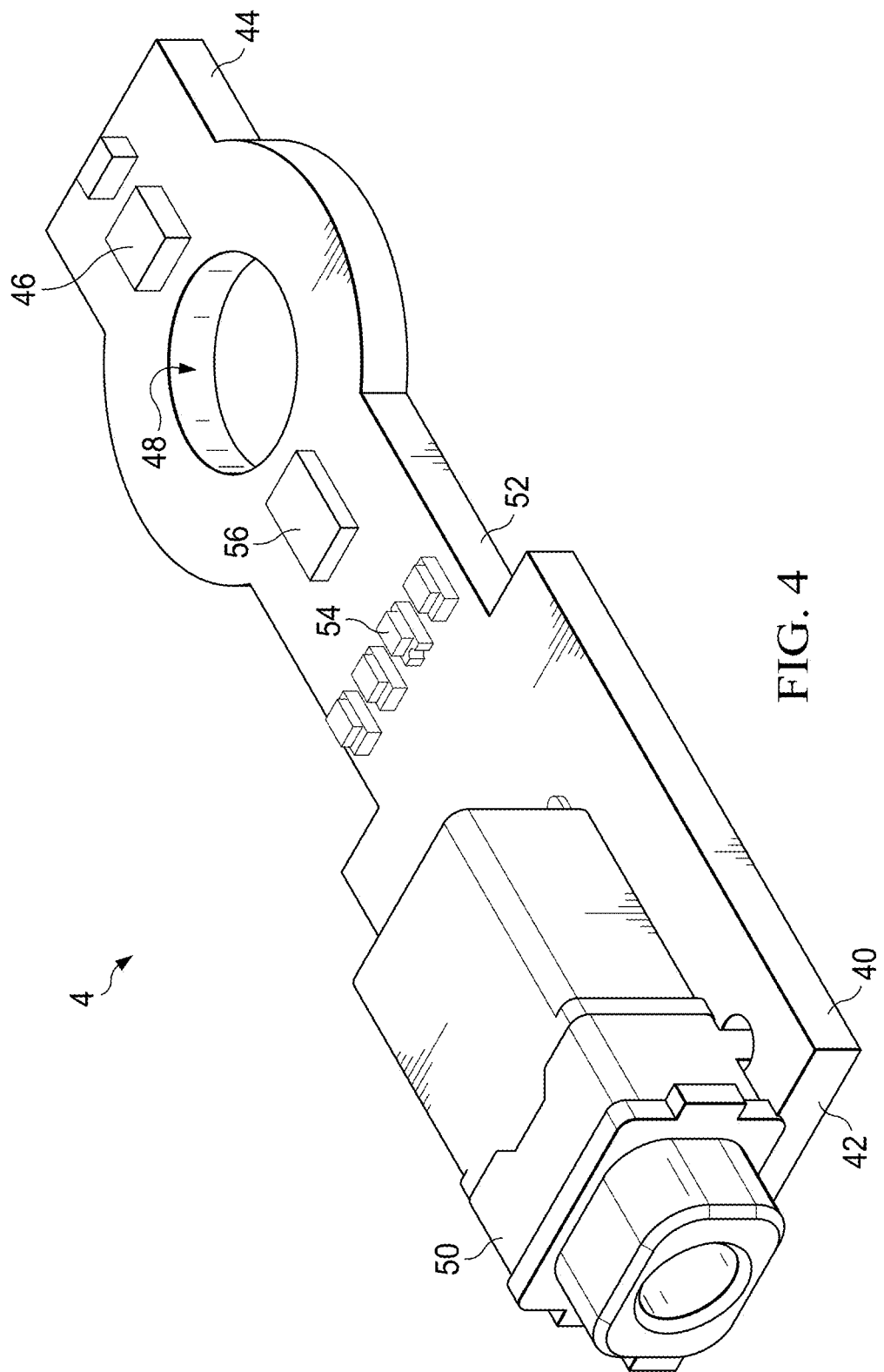
FIG. 4 is a perspective view of an exemplary embodiment of a circuit assembly is shown.
Figure 5:
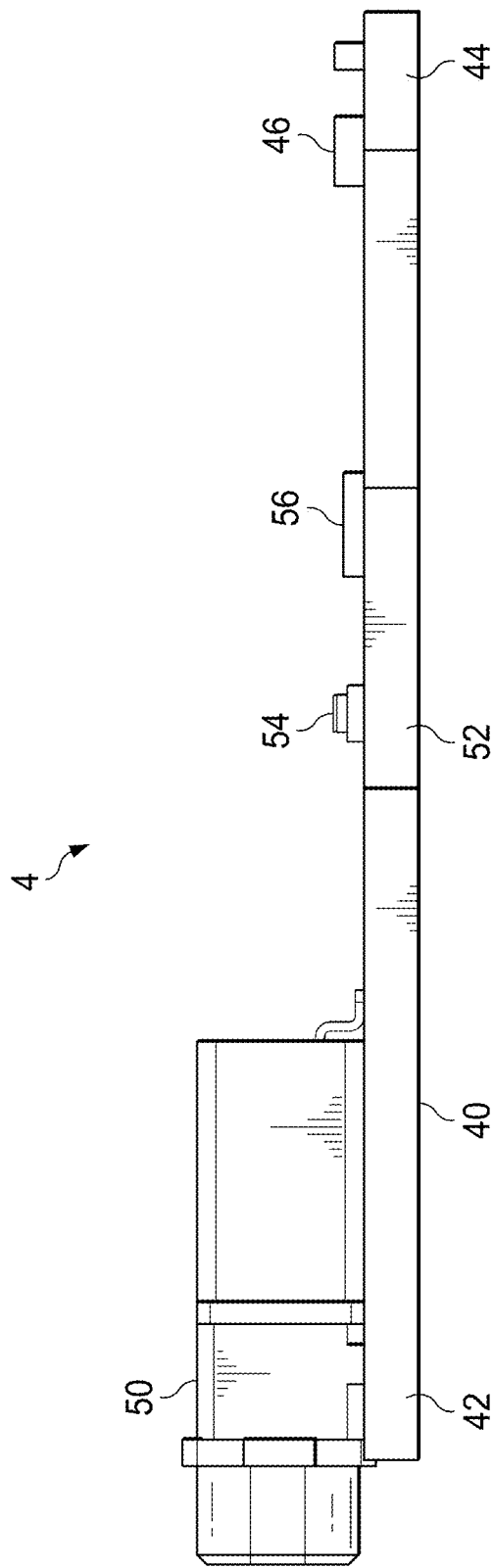
FIG. 5 is a right side elevational view of the circuit assembly of FIG. 4 is shown.
Figure 6:
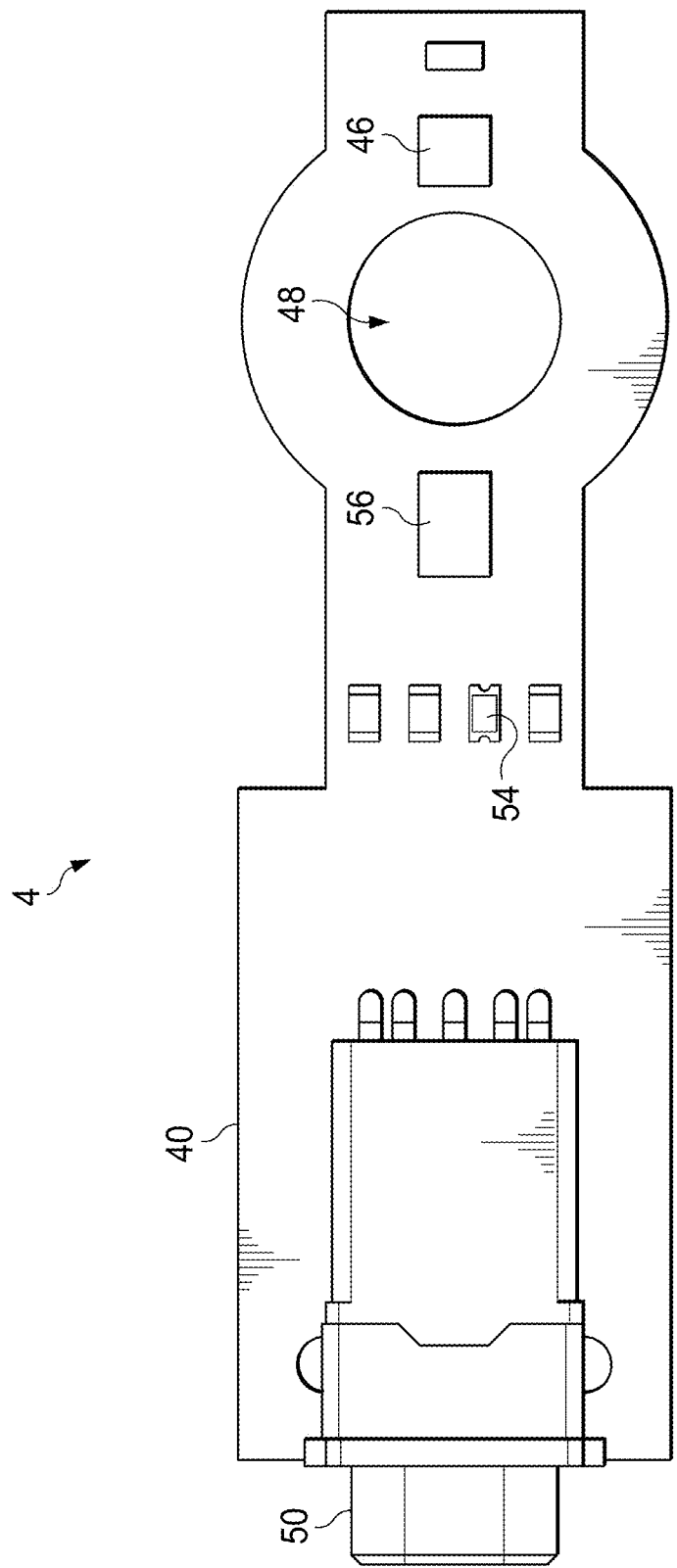
FIG. 6 is a top plan view of the circuit assembly of FIG. 5 is shown.

Referring to FIGS. 4-6, the exemplary circuit assembly 4 is shown. The circuit assembly 4 is comprised of a circuit board 40 having a first end 42 and a second end 44 where a temperature sensor unit 46 is located, with a circular thermal break 48 located between the temperature sensor unit 46 and the first end 42. Located on the first end 42 is a power connector 50 for receiving a power plug connected to a power source, and transmitting power to the circuit assembly 4. The power connector 50 may also transmit data to and from the circuit assembly 4. In an exemplary embodiment, the power connector is a four conductor TRRS (tip, ring, ring, sleeve) cable comprising a ⅛ inch plug. In different embodiments different types of cables and plugs may be used for transferring power and data to/from the sensor.

In a middle portion 52 of the circuit assembly 4 located between the first and second ends 42, 44 may be an LED light 54 that turns on when the circuit assembly 4 is connected to a power source, and provides a visual indication to one or more users that the circuit assembly is working. In an exemplary embodiment, the LED light 54 may emit a single color, but in other exemplary embodiments the LED light 54 may be capable of emitting different colors, and different colors may indicate different types of information to a user. In yet other exemplary embodiments, the circuit assembly 4 may comprise multiple LED lights for providing different types of information to a user.

When the silicone volume 6 comprises silicone that is semitransparent, the LED light 54 may cause the temperature monitoring device 2 to look like it is glowing.

A memory chip 56 may store a variety of information including temperature readings obtained from the temperature sensor unit, and a calibration factor to be applied to temperature readings. This memory storage may provide the ability to store a calibration factor and may permit a temperature sensor that would otherwise not comply with government or regulatory standards to be effectively corrected and result in a sensor that is compliant with such standards. It may also permit an otherwise "failing" sensor to meet the certification standards of the National Institute of Standards and Technology ("NIST") at the U.S. Department of Commerce. In an exemplary embodiment, the memory chip may hold calibration data that ranges from +0.5° Celsius to −0.5° Celsius. For example, if a temperature sensor, prior to calibration, is always reading +0.1° Celsius over a true reading, the memory chip 56 may store a calibration factor of −0.1° Celsius. In an exemplary embodiment, the memory chip may permit a new calibration factor to be stored over an old value. However, in other embodiments only a single calibration factor may be stored on a memory chip, and may not be rewritten. Application of a stored calibration factor may be performed by a monitoring device in communication with the sensor. In an exemplary embodiment, when a monitoring device is in communication with a sensor it may first read the data values from the temperature sensor. The monitor may then look to see if there is a memory chip with a stored calibration factor. The monitoring device may download the calibration factor, and use the calibration factor with the temperature values provided by the temperature sensor to calculate the corrected temperature values. Correction of temperature values at the monitoring device may provide greater flexibility and operability in systems where a number of sensors are transmitting temperature values or other information to the monitoring device. That is, it may maintain backward compatibility with a number of sensors in use. In other exemplary embodiments, the circuit assembly 4 may comprise a processor that is able to apply a stored calibration factor to temperature readings from the temperature sensor, and transmit corrected temperature values off-sensor. In this type of embodiment, a monitoring device may not download the calibration factor as it is receiving temperature values that have already been corrected.

In some exemplary embodiments, a variety of memory storage may be integrated onto the circuit board 40 in order to permit storage of temperature readings and calibration information.

The temperature sensor 46 may be located across from a circular thermal break 48. The silicone of the silicone volume 6 traverses the circular thermal break 48, providing an anchor that holds the circuit assembly 4 in place, and prevents the circuit assembly 4 from being pulled out of the silicone volume when a power plug is pulled out of the power connector 50. The circular thermal break 48 creates a thermal break between the temperature sensor 46 and any other component on the first end 42 or middle portion 52 of the circuit board 40, such that the readings of the temperature sensor 46 will not be impacted by any heat that may be given off by such components. In an exemplary embodiment the temperature sensor 46 is a TMP117 (available through distributors including Digikey Electronics and Mouser Electronics). In other exemplary embodiments other temperature sensors, including other high-performance digital temperature sensors, may be used. Nothing herein is intended to limit the type of sensor or other circuit assembly componentry that may be used. Temperature sensors may be pre-calibrated or not.

In an exemplary embodiment the silicone utilized for the silicone volume may be of a sufficient elasticity (durometer) to deform for the purpose of installing and removing the sensor from a refrigerator or freezer rack. The temperature sensor is to obtain temperature readings that represent the internal temperature of a refrigerator or freezer's contents rather than the ambient air temperature in a refrigerator or freezer. In an exemplary embodiment the silicone volume has a thermal curve similar to glycol, or is otherwise similar to the thermal curve of common contents in a refrigerator or freezer. The temperature monitoring device 2 may be formed in a mold, with the circuit assembly 4 suspended and overmolded in liquid or soft solid silicone that is allowed to harden and cure in the desired shape.

While the exemplary embodiment described herein utilizes a silicone volume, one of ordinary skill in the art will recognize that a variety of materials may be used instead of, or in addition to, silicone, without departing from the inventive concept. Various types of polymers, including, but not limited to, rubber, may be utilized for the volume. Thermoplastic elastomers (TPE) may also be used.

The temperature monitoring device may be connected to an external device, such as a controller or monitor, via a power connector inserted into the port 36. In use, one or more temperature monitoring devices may be placed into a refrigerator and/or freezer and connected to one or more external controller devices located outside of the refrigerator and/or freezer. Temperature values obtained by the temperature sensor 46 may be transmitted to the external device to be displayed by a user, stored, or transmitted further to other devices or networks. External devices may permit wireless transmission of information.

Figure 7:
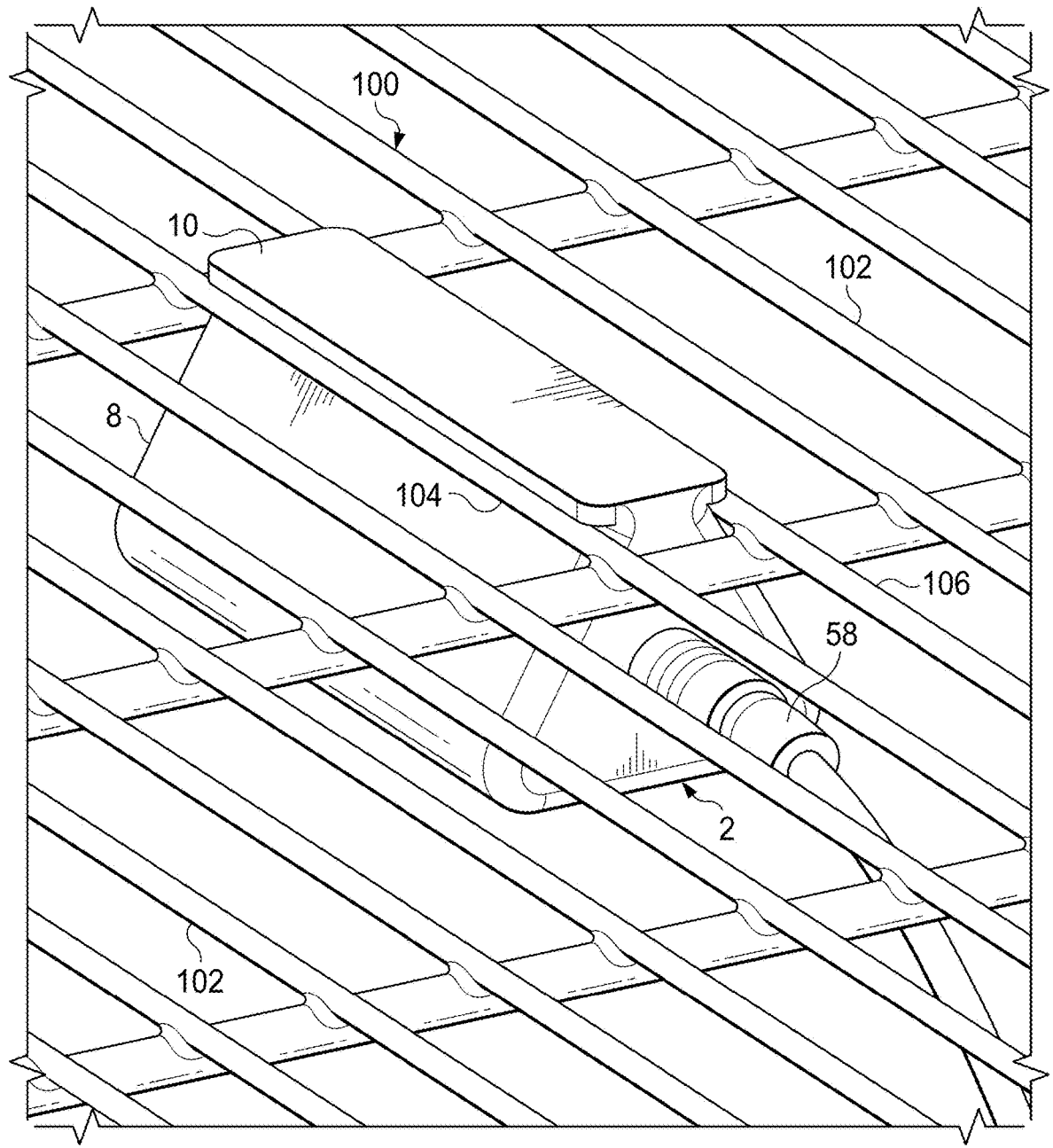
FIG. 7 is a perspective view of the temperature monitoring device of FIG. 1 installed on a refrigerator rack.

The temperature monitoring device 2 may be placed on top of a shelf or other surface inside a refrigerator or freezer. The flat sides of the body inhibit the sensor from rolling around. The sensor may also be suspended from the underside of a wire shelf. Referring to FIG. 7, a temperature monitoring device is shown in a suspended position. The flange may be inserted through the space between two wires in a wire rack. The flexibility of the silicone may permit the bidirectional flange 10 to flex as necessary to be inserted through the two wires. Once inserted, each underhang 34 of the flange 10 may rest upon a wire in the shelf, and permit the body 8 of the device 2 to remain in a suspended position underneath the wire rack. When a user desires to remove the temperature monitoring device 2 from the rack, they can flex the flange to disengage it from the wire rack.

The ability to suspend the temperature monitoring device 2 underneath a wire rack frees up shelf space that the device would otherwise inhibit at the expense of supplies. The flat top surface of the flange permits objects to be placed on top of it when the device is being suspended. It also enables a user to place the sensor in a central location in the refrigerator, in order to ensure accurate readings and for the sensor to experience the same temperature conditions that objects in the refrigerator or freezer would experience as well.

Figure 8:
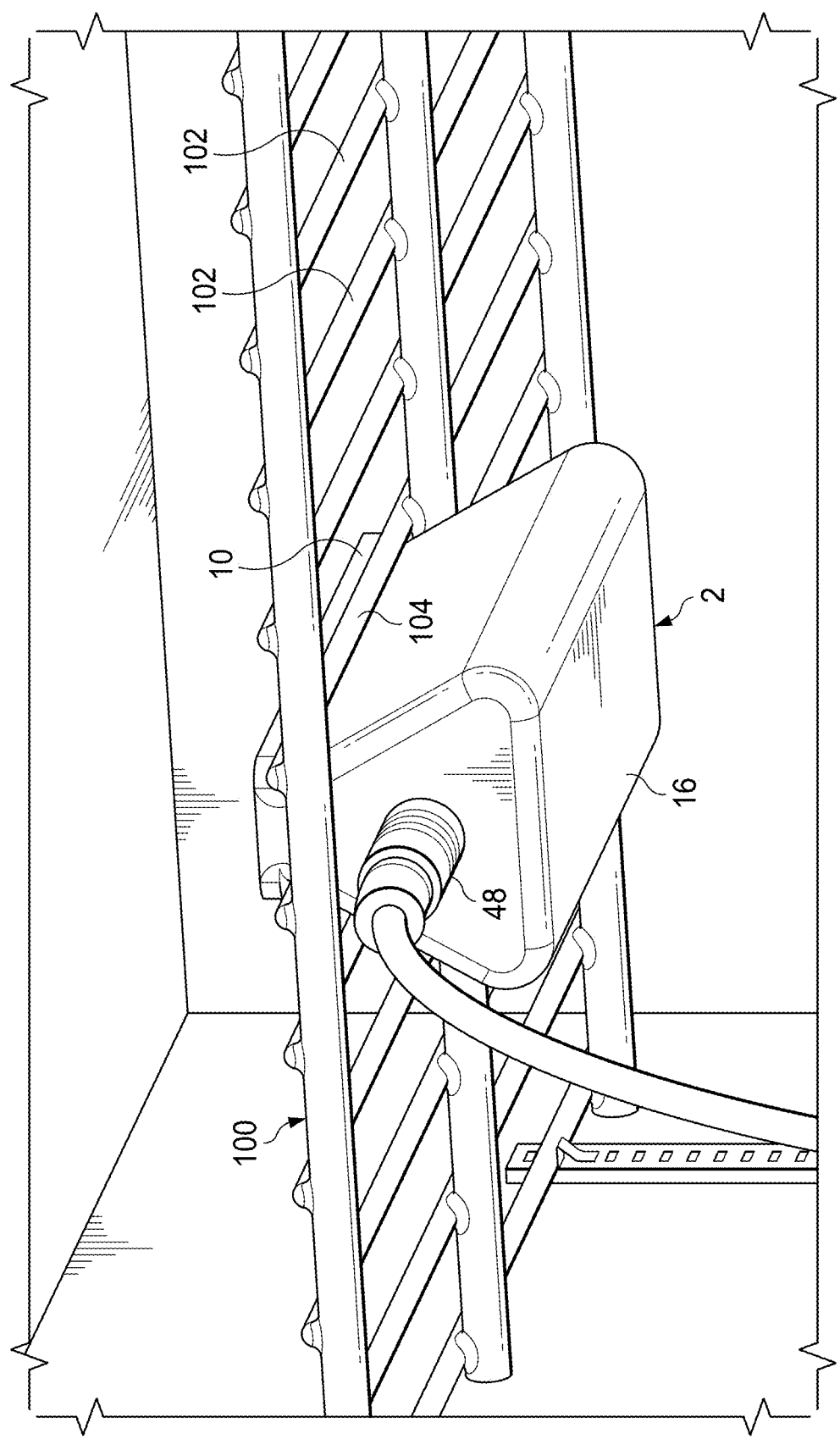
FIG. 8 is a perspective view of the temperature monitoring device of FIG. 1 installed on a refrigerator rack.
Figure 9:
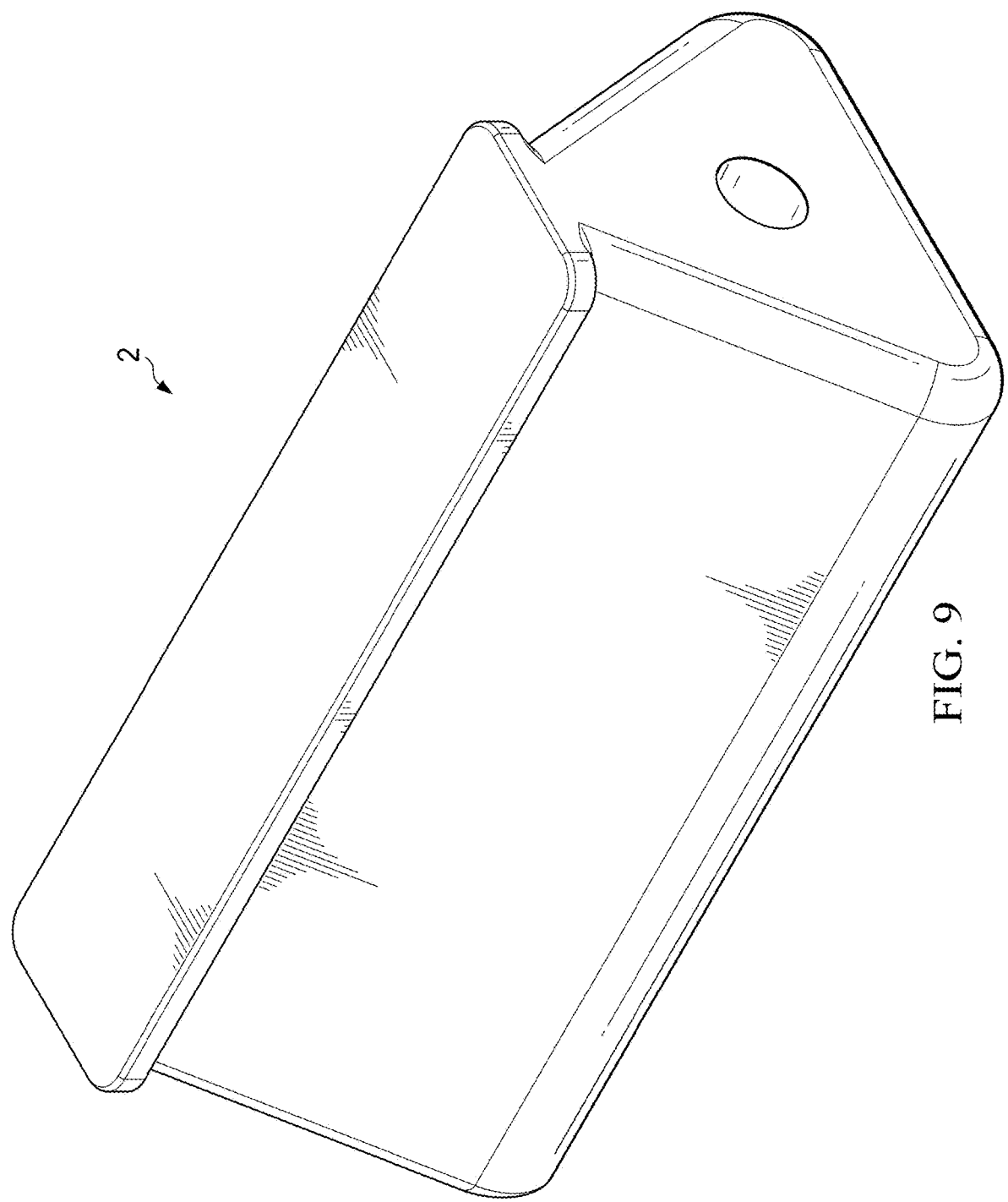
FIG. 9 is a perspective view of the temperature monitoring device of FIG. 1.
Figure 10:
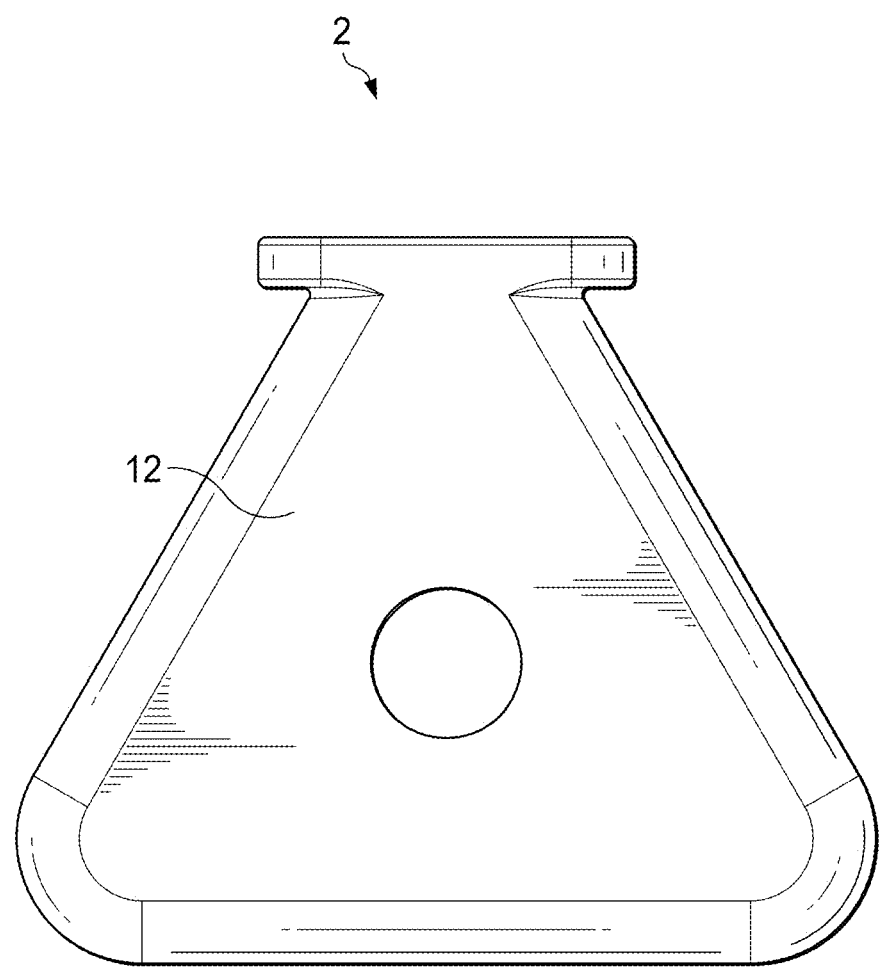
FIG. 10 is a front elevation view of the temperature monitoring device of FIG. 1.
Figure 11:
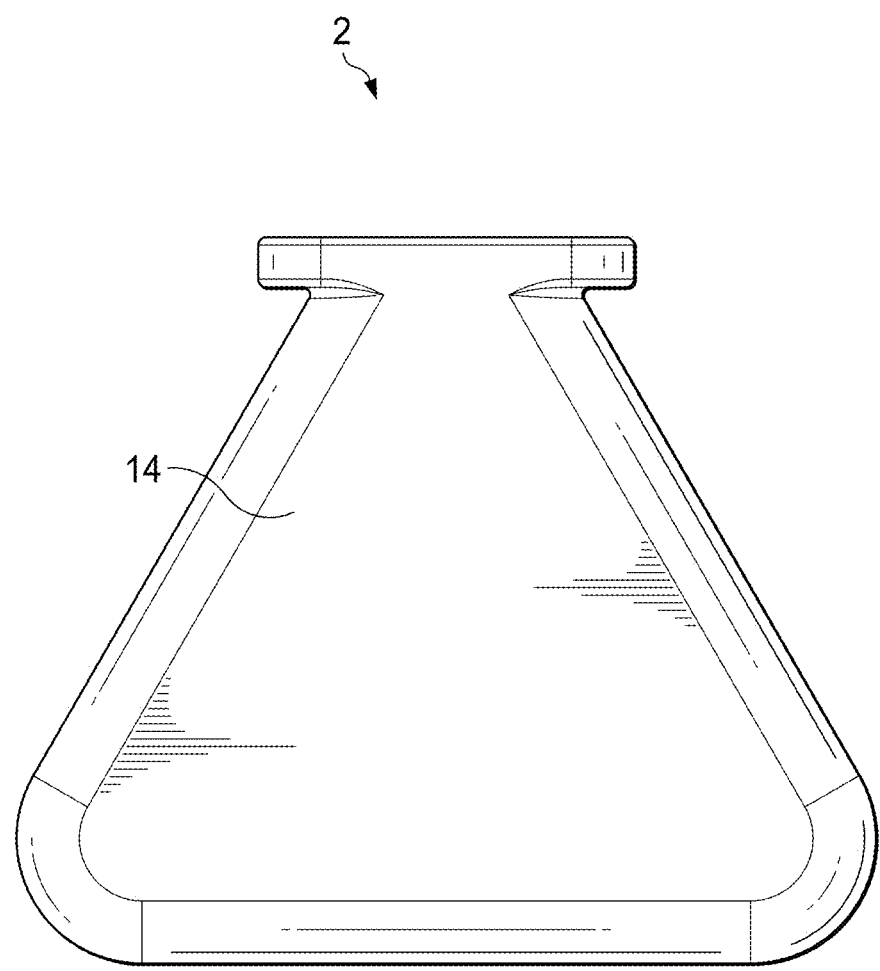
FIG. 11 is a rear elevation view of the temperature monitoring device of FIG. 1.
Figure 12:
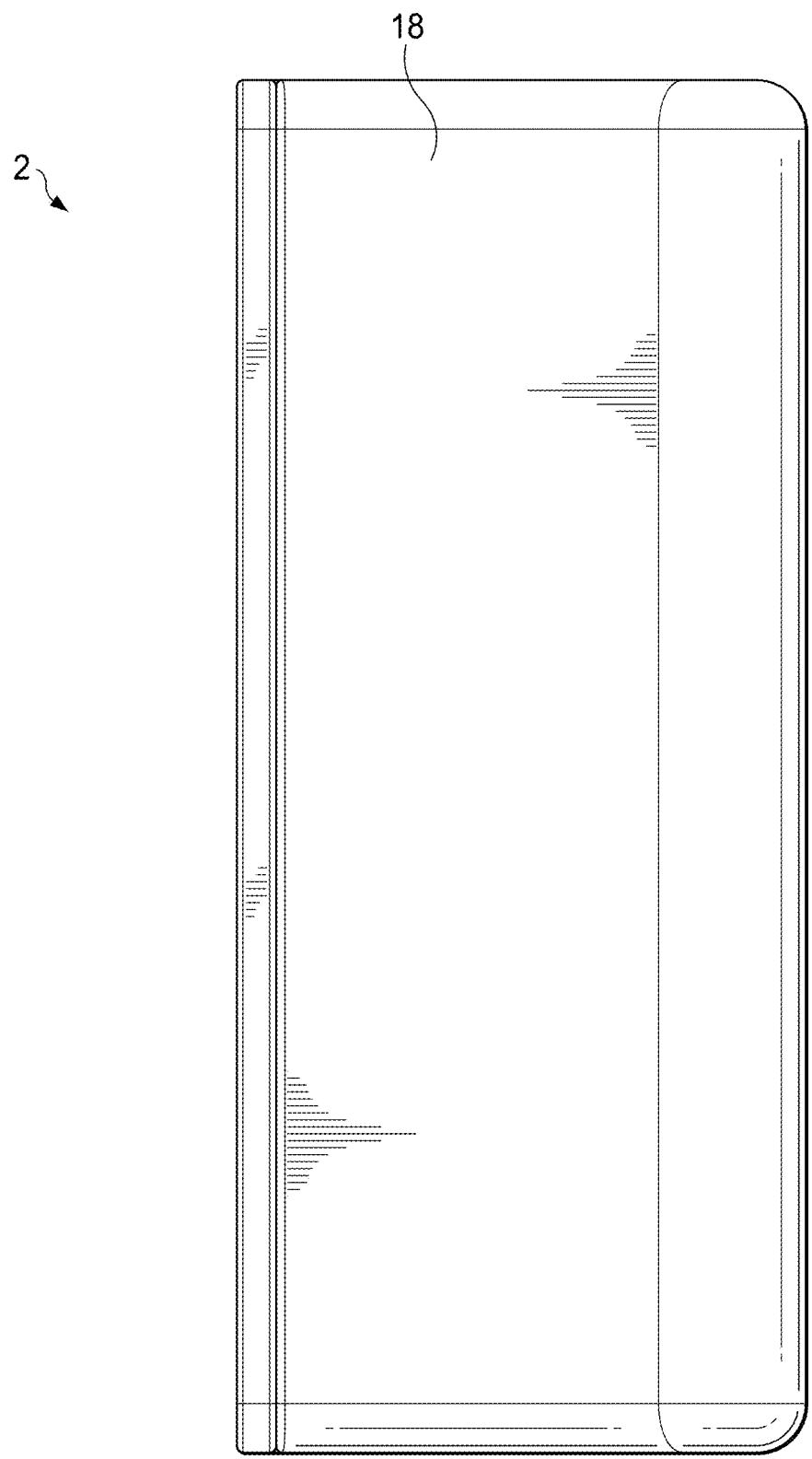
FIG. 12 is a right side elevation view of the temperature monitoring device of FIG. 1.
Figure 13:
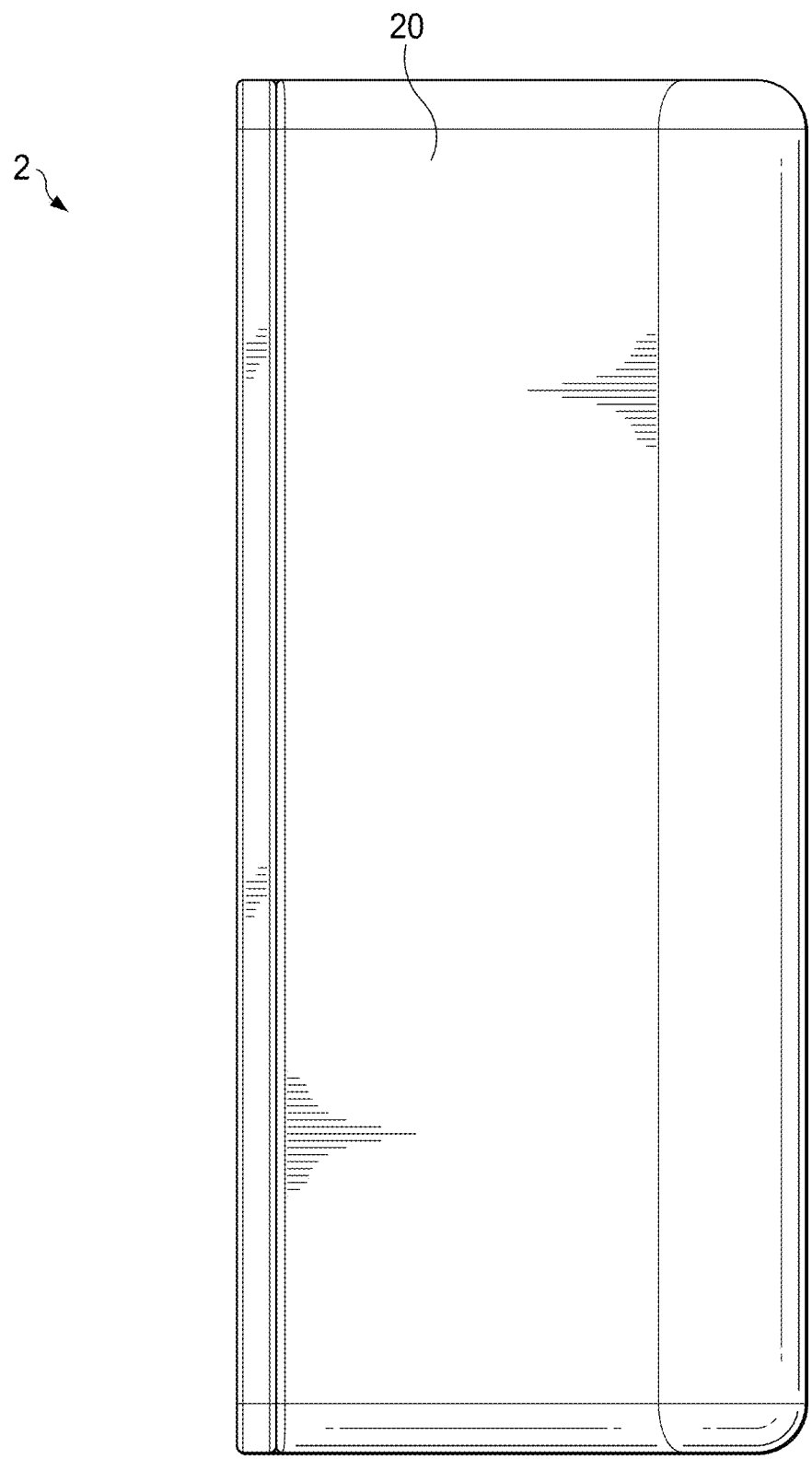
FIG. 13 is a left side elevation view of the temperature monitoring device of FIG. 1.
Figure 14:
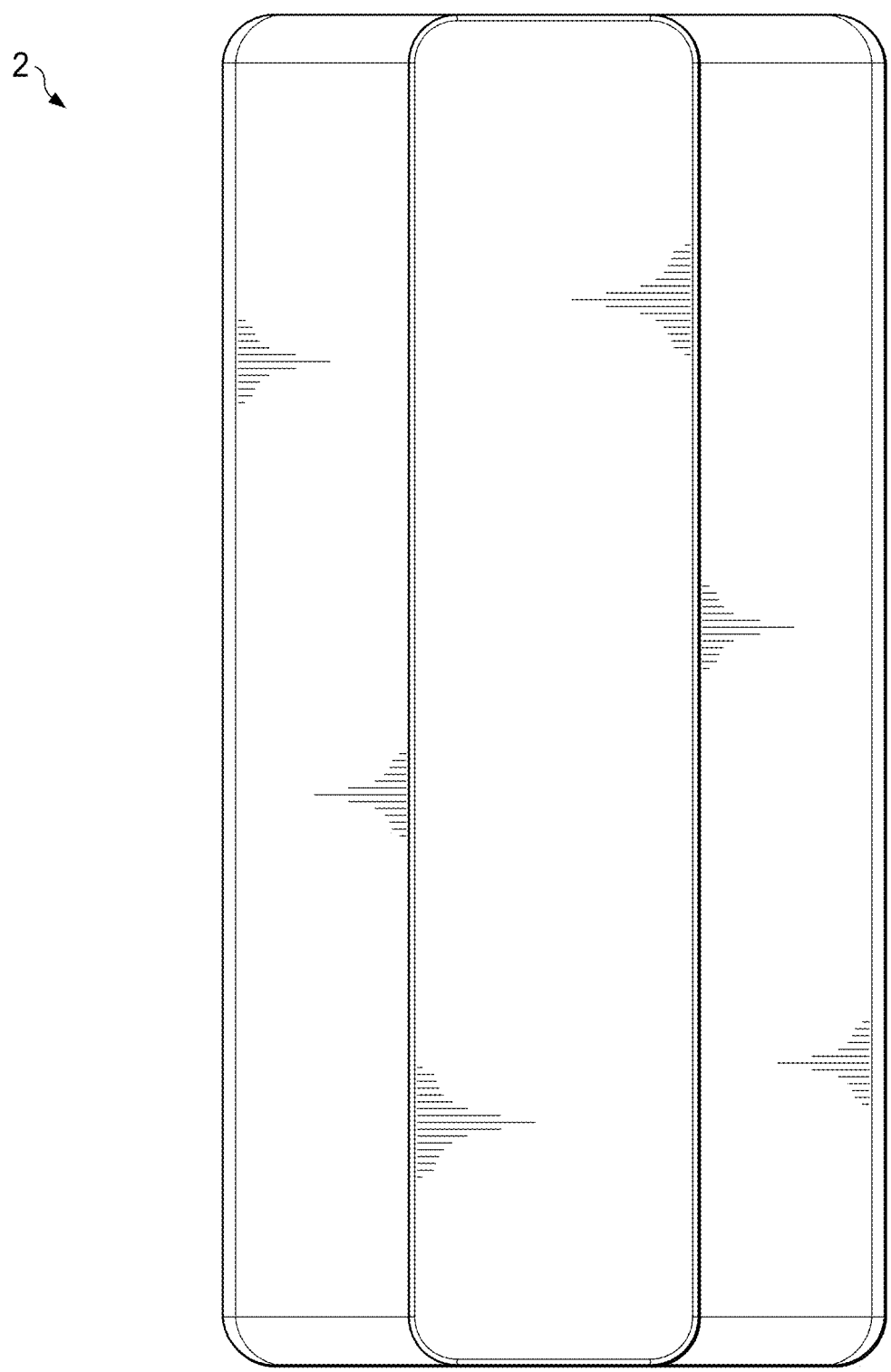
FIG. 14 is a top plan view of the temperature monitoring device of FIG. 1.
Figure 15:
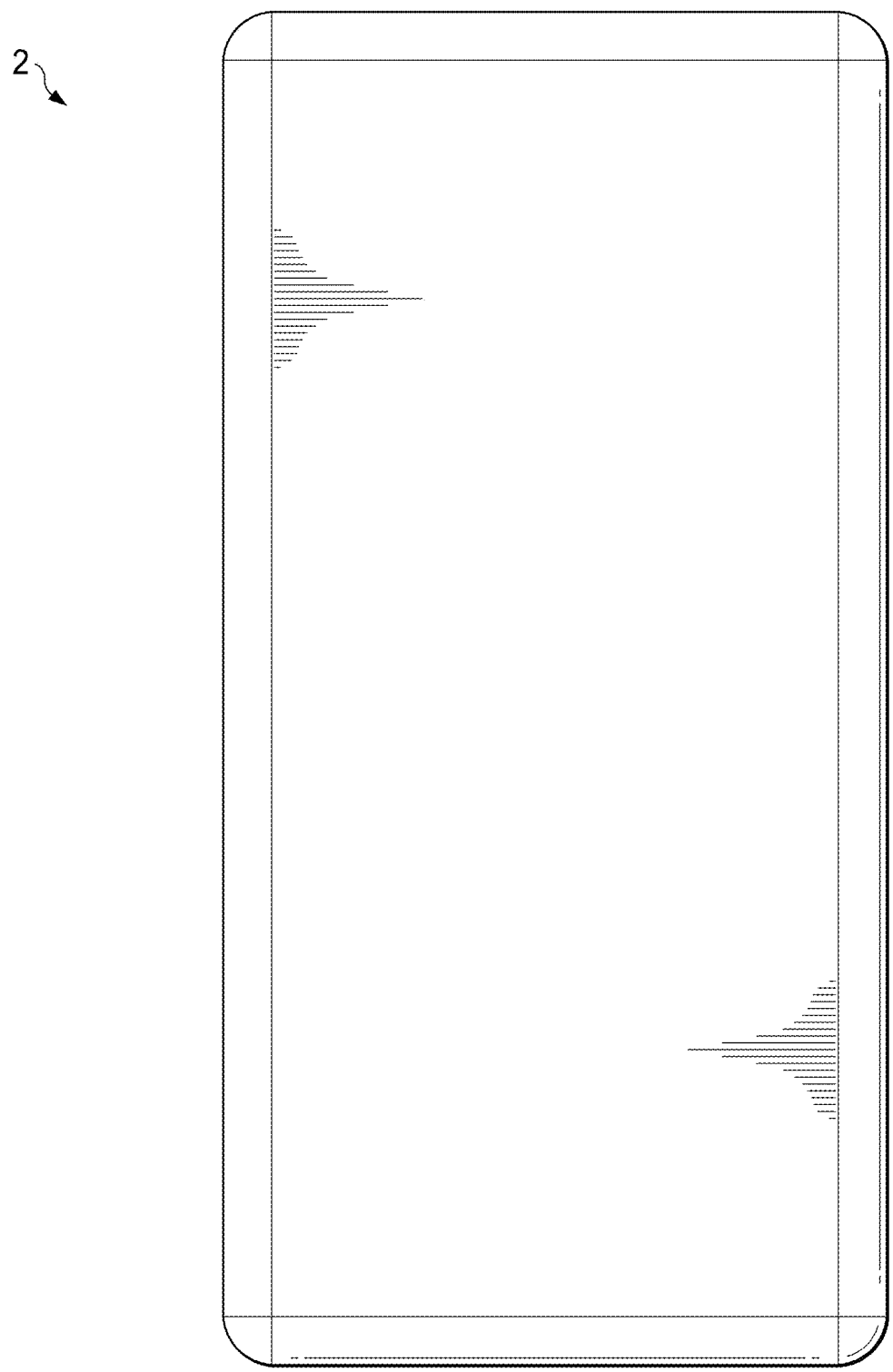
FIG. 15 is a bottom plan view of the temperature monitoring device of FIG. 1.

Referring to both FIG. 7 and FIG. 8, the device 2 is shown installed onto a rack 100 that may be located in a refrigerator or freezer. The rack 100 is comprised of parallel bars 102 generally located an equal distance from one another. For example, the bars 102 may be spaced 0.5 inches apart, 0.4 inches apart, 0.3 inches apart, or a variety of other distances apart. Different racks may have bars 102 set different distances apart, or may have racks that have varying spaces between parallel bars. The temperature monitoring device 2 may be installed onto the rack 100 by pushing the flange 10 through a space between first and second bars 104, 106 at an angle, and/or bending one or both sides of the bidirectional flange 10 such that the flange 10 can be inserted through the space between the first and second bars 104, 106. The flange 10 may be bent or flexed manually, or through use of a device.

Once the bidirectional flange 10 is inserted through the space between the first and second bars 104, 106 the flange 10 extends outwards over the first and second bars 104, 106. Each underhang 34 of the flange 10 rests upon the bars 102, and permit the body 8 of the device 2 to remain in a suspended position underneath the rack 100.

As shown in FIGS. 7 and 8, a power connector 58 connected to the temperature monitoring device 2 is also permitted to be located below the rack, and provides opportunity for the power connector 48 to avoid being threaded through the wires in a rack.

Referring to FIGS. 9-15, various view of the temperature monitoring device 2 are shown with the circuit assembly omitted.

The temperature monitoring device may be installed on a central portion of a rack, or anywhere else on a rack as desired by a user. The device may also be placed directly on a rack or other surface if desired, without any insertion of the flange through two bars. Furthermore, the device may be installed on top of a rack with the flange inserted downward through the bars, such that after installation the body of the device is located above the rack and anchored in place, and the flange is located below the rack. One of ordinary skill in the art will further recognize that the device may be anchored into, or suspended from, any surface or location that provides a void of a size and shape that accepts insertion of the flange but inhibits the flange from being removed absent bending of the flange or a strong force being exerted on the device to disengage the flange.

In an exemplary embodiment, additional means for attaching the device to a desired location within a refrigerator or freezer may be utilized. In one embodiment, two-sided tape may be used to attach the device to an interior surface of a refrigerator or freezer, or a shelf made of glass or plastic. In such embodiments, the device may or may not include a bidirectional flange.

The device may be used in a refrigerator, freezer, or any other environment where a user desires to monitor temperature.

In an exemplary embodiment the device may contain one or more labels comprising printed information, or machine-readable information. For example, serial numbers, product information, and/or contact info may be printed on the label, or may be accessible through a barcode presented on the label, a QR ("quick response") code, or an RFID chip integrated into the label. In this manner, a user may be able to access information through use of a variety of devices including bar code scanners, smart phones, tablets and personal computing devices, or RFID readers. Labels may also provide a user with information about any facility or agency that has certified or quality-tested the device, as well as details on the certification or quality-testing.

While the exemplary embodiments disclosed described the best modes known to the inventors at the time of filing, the scope of the invention is not intended to be limited to only the embodiments disclosed herein.

What is claimed is:

1. A temperature monitoring device, said temperature monitoring device comprising:
 a body, said body having a top end defined by a first width;
 a bidirectional flange connected to said top end of said body, said bidirectional flange defined by a second width;
 a circuit assembly located within said body, said circuit assembly comprising a first end and a second end, and said circuit assembly comprising temperature sensor configured to provide temperature data, said temperature sensor located on said second end, and said circuit assembly comprising a thermal break located between said first end and said temperature sensor; and
 wherein said bidirectional flange is flexible, and said first width is narrower than said second width.

2. The temperature monitoring device of claim 1, wherein said body is comprised of silicone.

3. The temperature monitoring device of claim 2, wherein said bidirectional flange is comprised of silicone.

4. The temperature monitoring device of claim 3, wherein said body and said bidirectional flange are formed from one volume of solid silicone.

5. The temperature monitoring device of claim 1, wherein said circuit assembly further comprises memory storage, said memory storage configured to store a calibration factor associated with said sensor.

6. The temperature monitoring device of claim 1, wherein said circuit assembly further comprises a light.

7. The temperature monitoring device of claim 1, wherein said circuit assembly is largely encased in a volume of solid silicone.

8. The temperature monitoring device of claim 1, wherein said body has the general shape of a triangular prism with a front face and a rear face, and said bidirectional flange extends from said front face to said rear face.

9. The temperature monitoring device of claim 1, wherein said body has the general shape of a triangular prism with a front face and a rear face, and said bidirectional flange extends from said front face to said rear face.

10. The temperature monitoring device of claim 9, wherein said body and said bidirectional flange are comprised of solid silicone.

11. A temperature monitoring device comprising:
   a solid silicone volume, said silicone volume comprising:
      a body, said body having a generally triangular prism shape, said body having a front face, a rear face, a bottom side, a right side, and a left side, a first vertex between said bottom side and said right side, a second vertex between said bottom side and said left side, and a transected vertex between said right side and said left side;
      a bidirectional flange, said bidirectional flange extending from said front face to said rear face along said transected vertex, said bidirectional flange comprising two underhangs;
      a circuit assembly located within said body, said circuit assembly comprising a temperature sensor in direct contact with said solid silicone volume, and said temperature sensor configured to provide data related to the temperature of the solid silicone volume;
      wherein said bidirectional flange is flexible and has a width greater than the width of said transected vertex.

12. The temperature monitoring device of claim 11, wherein said circuit assembly further comprises memory storage, said memory storage configured to store calibration information unique to said temperature sensor.

\* \* \* \* \*